United States Patent [19]

Szabo et al.

[11] 4,321,845
[45] Mar. 30, 1982

[54] BAR PULLER FOR NUMERICALLY CONTROLLED LATHE

[76] Inventors: Tibor Szabo, 2506 West Ave., 130th, San Leandro, Calif. 94577; Robert L. Karr, 36375 Bettencourt St., Newark, Calif. 94560

[21] Appl. No.: 160,986

[22] Filed: Jun. 16, 1980

[51] Int. Cl.³ .................... B23B 13/00; B23B 5/22
[52] U.S. Cl. ................................. 82/2.5; 279/119; 82/36 A
[58] Field of Search ............... 82/2.5, 36 A; 279/119, 279/120, 118, 121, 122

[56] References Cited

U.S. PATENT DOCUMENTS

| | | | |
|---|---|---|---|
| 3,678,790 | 7/1972 | Riley | 82/2.5 |
| 3,703,112 | 11/1972 | Selby | 82/2.5 |
| 3,744,808 | 7/1973 | Hughes | 279/119 |
| 3,797,837 | 3/1974 | Roddy et al. | 279/118 |
| 4,009,888 | 3/1977 | Wallace | 279/119 |
| 4,236,722 | 12/1980 | Felker | 279/119 |

Primary Examiner—Harrison L. Hinson
Attorney, Agent, or Firm—Bielen and Peterson

[57] ABSTRACT

An automatic bar puller for a numerically controlled turret lathe, the puller being mounted on one station of the turret and have a detent actuated jaw that grips the end of a chuck mounted workpiece on triggering of a contact stop on the puller by the workpiece, and, the lathe controlling displacement of the workpiece and release of the jaw.

10 Claims, 5 Drawing Figures

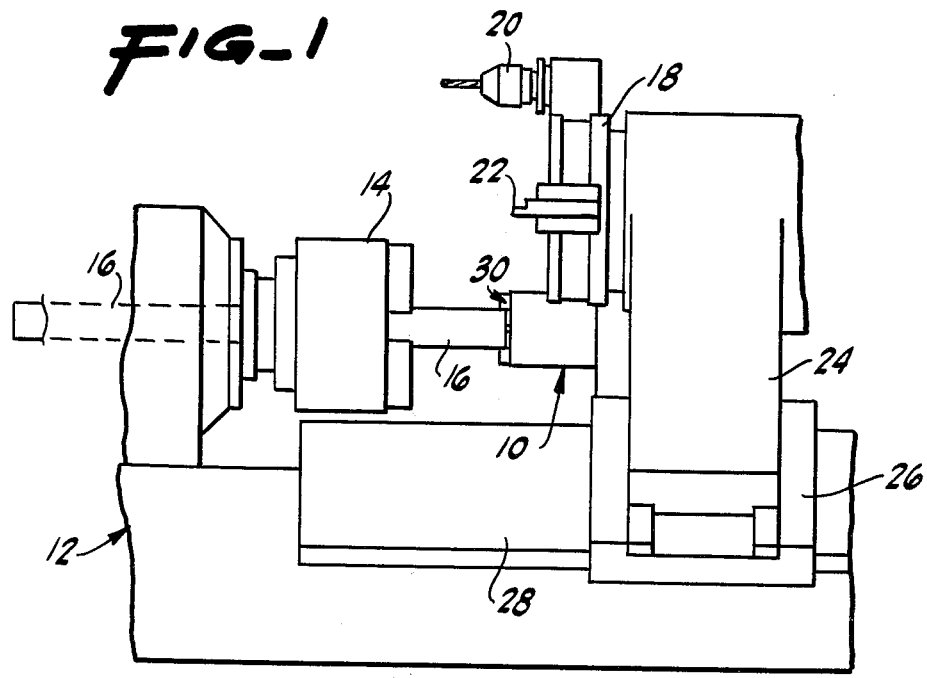
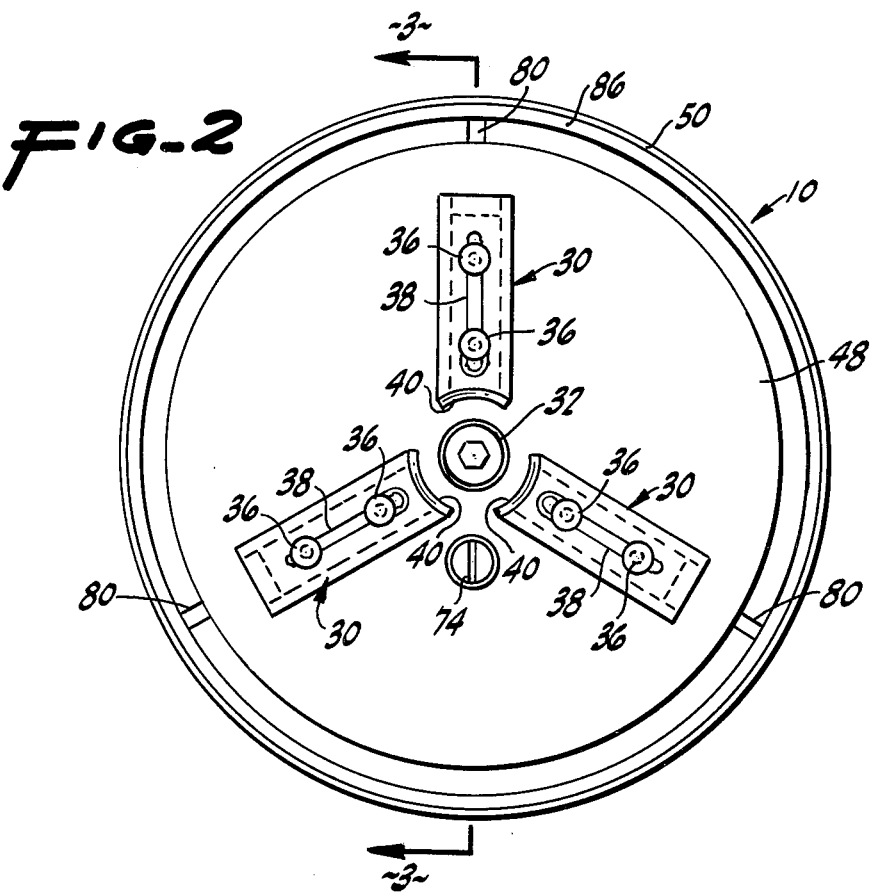

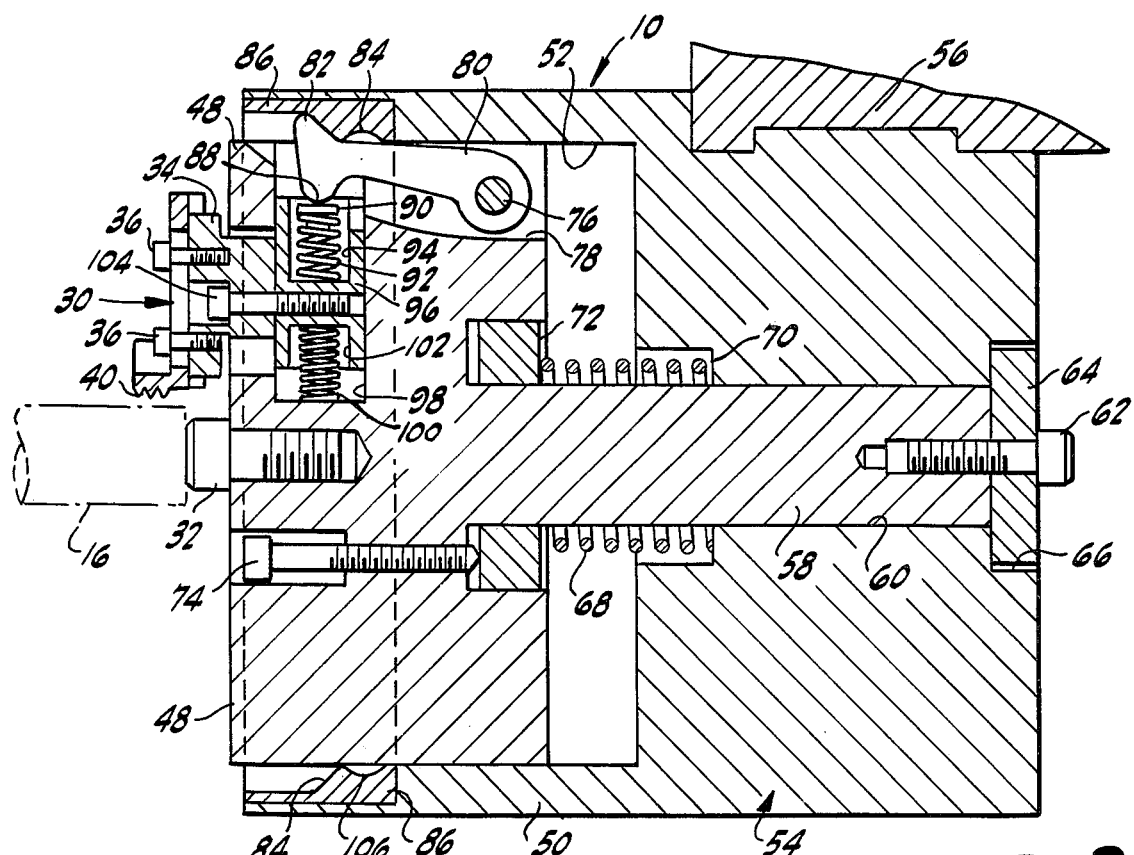
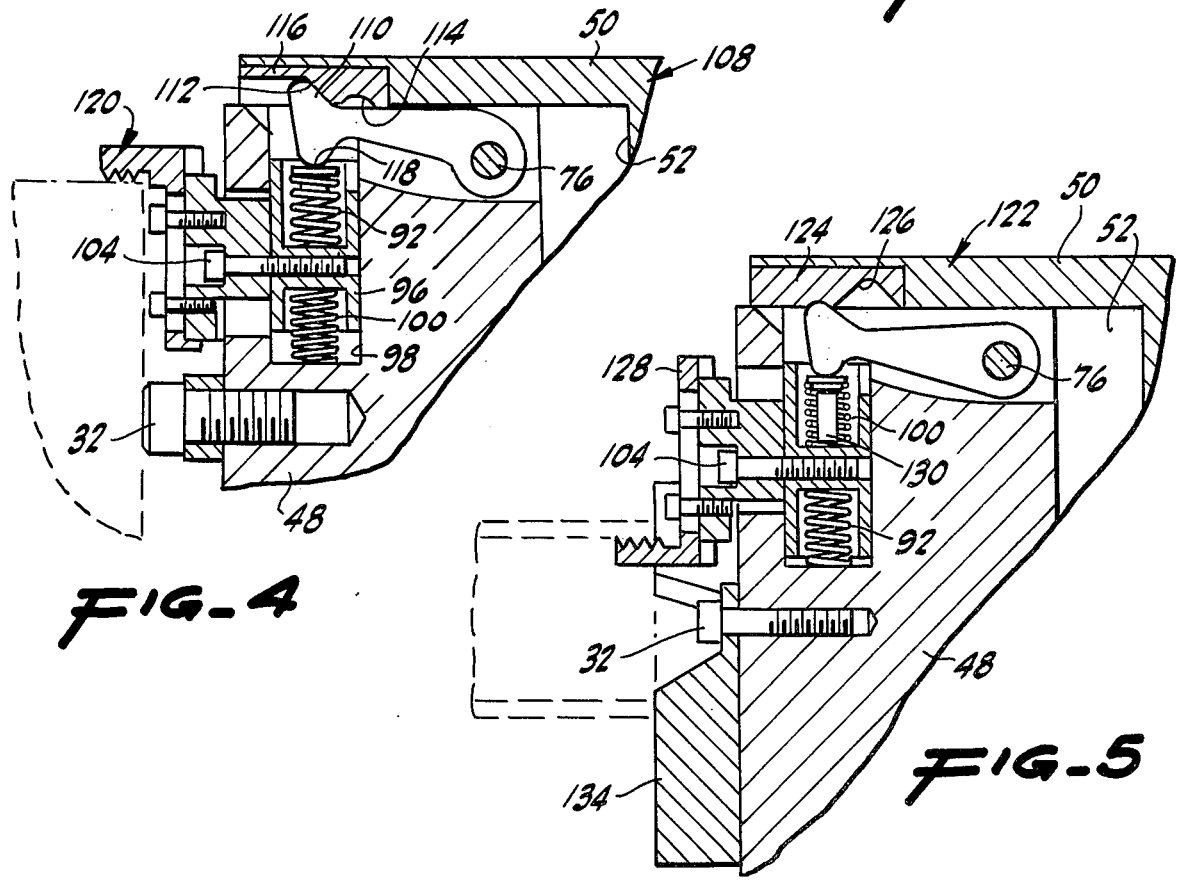

BAR PULLER FOR NUMERICALLY CONTROLLED LATHE

BACKGROUND OF THE INVENTION

This invention relates to an attachment for a numerically controlled turret lathe to enable the bar stock workpiece to be displaced in the spindle chuck or collet. Such displacement is desired, for example, in multiple piece work where workpieces are machined and severed from an elongated supply stock and it is desired to automatically reset the supply stock in the spindle chuck for machining of the next piece. Conventionally, this stock reset is accomplished either by hand or by an auxilliary stock feed device mounted behind the spindle chuck for hydraulically controlled incremental transport of the stock material through the chuck to the work area. In addition to the expense of the device, the internal electronic transport control of the feed device must be coordinated with the master operation controls of the numerically controlled lathe. Additionally, as the feed mechanism is operated from behind the chuck, the complete length of the bar stock cannot be fed through the chuck which results in stock waste.

Front mounted stock pullers have been proposed but have not heretofore been operationally successful. For example, one device designed for turret mounting utilizes a tapered sleeve to engage the outer periphery of the workpiece and pull the piece a predefined displacement after a press fit engagement. The number of different sized sleeves required to accomodate different sized workpieces makes the device inconvenient to use. Furthermore, because the tapered press grip accentuates diameter differences in the finished or unfinished bar stock, the sleeve may not consistently locate itself with relation to the stock during engagement, resulting in variations in successive stock displacements or complex error adjustment routines in the control system.

In a numerically controlled turret lathe the turret position and displacement, and the chuck opening and closure can be controlled by appropriate preprogramming of the lathe. It is therefore desirable to utilize the turret for installation of a bar puller as electronic instructions and dynamic action to effect the bar pull operation can be largely accomplished by the internal controls of the lathe system itself. The automatic bar puller of this invention is designed for installation on one of the turret stations of a numerically controlled turret lathe, and is entirely mechanical in operation relying on the control system of the turret lathe to initiate the sequential actions that trigger the actuation of the puller.

SUMMARY OF THE INVENTION

The bar puller of this invention is designed for installation on a numerically controlled turret lathe for the purpose of automatically displacing the bar stock in a spindle chuck or similar releasable holding device. The invented bar puller is mechanical in operation and relys on the sequence control system of the lathe to initiate the actuations of the bar puller. The bar puller is detachable auxiliary component that occupies a turret station only when advantageous to utilize the bar puller in a machining operation, generally of a repetitive piecework type nature.

A numerically controlled lathe is a lathe that is programmable for a sequence of opertaions which are automatically executed. To accomplish such sequence effectively, the lathe is equipped with a rotatable turret having a plurality of tool stations for mounting selected tools which are rotated to an operating position on command of the lathe controller.

While a numerically controlled lathe can perform a series of different operations on a workpiece, such lathes do not have the capability of advancing the working stock in the chuck or collet. Such operation is particularly useful after a workpiece has been severed from the stock and it is desired to repeat the machining sequence on a next subsequent piece.

The subject bar puller has a mounting block that is designed to be compatible with the turret mount of the particular machine on which it is used. It is to be understood that different machines may require that the mounting block be constructed according to a different design dependent on the particular turret mount requirements.

To initiate a bar pull operation, the turret is pivoted to the position the bar puller 15 on line with the workpiece. The turret carriage is displaced on axis toward the stock or piece.

The bar puller has a grip housing integral to the mounting block in which is housed a piston-like head with an outer face including three, detent actuated jaws. The jaws are designed to grip the peripheral end of the bar stock or workpiece to effect the stock or piece displacement placement on release of the stock or the piece from the lathe chuck turret. The grip head is spring cushioned in the housing with an allowed discrete displacement on contact by a stop on the contact force with the bar stock or workpiece for initiation of the pulling operation. During this displacement, a spring loaded detent mechanism, which is mounted on the vice head, contacts a cam surface on the inner wall of the housing pivotally displacing the detents until the detents locate in locking grooves on the cam surface. The displacement of the detents displaces the jaws to a gripping position of the stock or piece.

The gripping force is determined by a compression spring connection between the detents and the carrier unit for the jaws and is thereby defined by the spring constant and the displacement increment after first contact of the jaws with the stock or piece. Selection of substitute compression springs of desired spring constant and jaw setting allows a range of gripping force necessary to perform the operation without damage to the bar stock or workpiece.

When the puller has engaged the bar stock or workpiece, and the jaws have been actuated to a set position, the stock or piece is released from the lathe chuck by automatic control and displaced by a programmed movement of the turret carriage.

To release, the lathe chuck is reset to hold the stock or piece and the puller further displaced from transport by the turret carriage. The detents traverse the locking grooves and cam surface releasing the jaws to a set open position. The puller is then withdrawn from the stock or piece and pivoted by action of the turret to a nonoperational position.

These and other features of the bar puller will become apparent upon a detailed consideration of the description and drawings.

BRIEF DESCRIPTION OF THE DRAWINGS

FIG. 1 is a schematic view of the bar puller and a portion of an associated turret lathe.

FIG. 2 is an end view of the bar puller.

FIG. 3 is a cross sectional view taken on the lines 3—3 in FIG. 2.

FIG. 4 is a partial cross sectional view of a first alternate design of a detent mechanism.

FIG. 5 is a partial cross sectional view of a second alternate design of a detent mechanism for pulling pipe stock.

DETAILED DESCRIPTION OF THE PREFERRED EMBODIMENT

Referring to FIG. 1, the working station of a state of the art numerically controlled turret lathe is shown to schematically illustrate the operational positioning of the bar puller 10. The turret lathe 12 has a hollow bar stock chuck 14 through which an elongated bar stock 16 is mounted. Facing the chuck 14 is a rotatable turret 18 for mounting one or more tools such as a drill 20 and cutting tool 22. The turret shown is octagonal in configuration with eight tool stations which on controlled pivot of the turret can be selectively rotated to the working station, here the lower most position wherein the bar puller is shown positioned.

The turret is in turn mounted to a carriage 24 that is mounted for displacement on a first axis on a movable bed 26 which in turn is mounted for displacement on a second axis perpendicular to the first axis on a stationary bed 28.

Turret station selection and movement are automatically controlled by an internal programmable controller in the lathe. In FIG. 1 the turret has been positioned to align the bar puller 10 along the axis of rotation of the chuck and bar stock. The bar puller 10 is shown with its jaws 30 gripping the peripheral outer edge of the stock 16 prepatory to initiating the pull operation which is accomplished by automated displacement of the turret upon command release of the stock in the lathe chuck.

The mechanism triggering the jaw grip of the bar puller is shown in detail in FIGS. 2 and 3. In FIG. 2, the jaws 30 are symmetrically arranged around a central stop screw 32 which functions as the contact surface for the bar stock. The projection of the stop screw 32 can be adjusted to control the depth of bite of the jaws on the outer periphery of the stock. The jaws are each fastened to a carrier member 34, shown with greater clarity in FIG. 3, by two adjustment screws 36, which pass through elongated adjustment slots 38. The jaws overhang each side of the carrier in the fashion of a slide and track to assure precise alignment. In this manner, the jaws can be uniformly or asymmetrically adjusted as desired by the operation for the size or configuration of the work piece or bar stock being machined. For unusually large diameter stock the jaws can be of different design with the grip surface 40 on the opposite side to that shown in FIGS. 2 and 3 (i.e. as in FIG. 4), enabling the jaw of the embodiment of FIG. 4 to grip the outside periphery of a large diameter workpiece.

The jaws 30 and jaw carrier 34 are part of an actuating mechanism that is largely located within a piston-like head 48 which is positioned for reciprocal interaction with an outer housing 50. The housing 50 encompasses the reciprocal head 48 and includes a cavity 52, in which the head 48 is situated, and a mounting portion having a configured mount 56 that is selectively constructed to be compatible with the tool mount on the turret of a particular brand of lathe, in this instance, a MORI SEIKI SL-1 CNC Lathe.

The head 48 is retained and the reciprocation delimited by a connecting shaft 58 located in a central bore 60 in the mounting portion of the housing and integrally connected at one end to the head 48 and fastened by a machine screw 62 to a retainer ring 64 which is seated in a countersunk recess 66 at the end of the housing. The head 48 is biased to the position shown in FIG. 3 by a compression spring 68 sandwiched between a recess shoulder 70 in the housing and a movable collar 72 that is displaceable by an adjustment screw 74 through the head 48. The adjustment screw 74 allows the degree of compression and hence the bias force to be varied, which is significant in defining the ease of release of the jaws as described hereafter. As a result of this construction the displacement of the piston head 48 is limited by the end wall of the cavity in one direction and the reatiner 64 in the opposite direction.

This limited reciprocation capability is utilized to actuate the jaws by a cam and detent mechanism. Mounted on a journal pin 76 in a hollow 78 in the side of the head 48 for each jaw is a detent 80 having a tracking surface 82 which follows a cam surface 84 on an inset ring 86 to the housing. Opposite the tracking surface is a contact surface 88 which contacts a load button 90 at the end of a stiff compression spring 92. The compression spring 92 acts as a load spring and is contained in a recess 94 of an actuating piston 96. The actuating piston 96 is retained for reciprocal action by a radial bore 98 in the head 48.

Essentially, displacement of the load button 90 will effect a corresponding displacement of the actuating piston unless a resistance is met by the piston which will result in a forced compression of the load spring 92. A light return spring 100 is mounted in a recess 102 in the piston opposite the recess 94 of the load spring 92. This returns the piston and load button with attached uncompressed spring to and outwardly displaced position. This is occasioned when the detent is not forcing an inward displacement because of its relative position on the cam surface.

The jaw carrier 34 is fastened to the piston by a machine screw 104 and results in the jaw following directly the displacements of the piston. In the embodiment of FIGS. 2 and 3, the cam surface is configured to direct the detents 80 inwardly as the head 48 is displaced toward the mount portion of the casing, for instance, when the bar stock contacts the stop screw and continues to push the head. The pistons 96 and attached jaws 30 follow and converge on the bar stock. Once the outer peripheral surface of the stock is contacted by the jaws, a resistance to piston displacement is generated and any further displacement of the detent 80 is absorbed by the compression of load spring 92. This produces an effective clamping force on the stock by the jaws. The displacement of the detent is therefore not directly conveyed to the jaws, but is essentially a translated effect, comprising a displacement plus a force application. As noted, this force is adjustable by selection of compression spring of differing spring constant or by adjustment of the jaws which affects the point of first contact with the workpiece and hence the degree of compression of the spring.

To prevent dislocation of the activated gripping force on release of the pushing force by the bar stock against the stop screw, the cam surface 84 of the inset ring 86 is provided with a locking groove or recess 106. When the tracking surface 82 of the detent 80 lodges in the locking groove 106 an external force is required to dislodge the detent and thereby release the jaws.

This force is accomplished by a pulling action by the bar stock effected by the lathe turret movement. For instance, after the jaws have gripped the end of the bar stock and the chuck has opened sufficiently to release the bar, the stock is displaced a select distance by displacement of the turret. Subsequently, the chuck is closed gripping the workpiece in position for the next machining operation. Then by displacing the turret and bar puller away from the stock and chuck, the stock is effectively pulled out of the bar puller. During this operation, the head 48 with the actuating mechanism is retained on the stock causing the detent to be dislodged from the cam groove and tracked to a position on the cam surface where the jaws are released from its grip position on the stock thereby releasing the stock. This action is assisted by a push from the compression spring 68 behind the head 48 as well as the pull from the stock. As noted, the degree of push and hence the ease of the pull required is adjustable by the setting of the collar 72 by adjustment screw 74.

While the embodiment of FIGS. 2 and 3 is one embodiment, changes can be included to emphasize different applications. For example, in FIG. 4, the actuating portion of a mode feed bar puller 107 is shown with a modified detent 110. The detent shown has a tracking surface 112 that tracks the cam surface 114 of the inset ring 116 which is not directly opposite the contact surface 118. Because the contact surface 118 is closer the detent point of pivot at pin 76, the piston displacement is reduced, but the translated force for a given cam resistance is greater allowing the use of an even stiffer load spring. The modification can be accomplished by substituting the inset ring 116 and detent 110 for the ring 86 and detent 80 of FIG. 3 as shown, or by a redesign of the entire detent mechanics and head. Such a modification is useful for handling larger bar sotck. In such instance, a modified jaw 120 is employed to encompass large diameter stock. As noted, such jaw may be similarly used on the prior embodiment of FIGS. 2 and 3.

In certain instances it may be desirable to grip the inside surface of a hollow stock or workpiece. In such instance, the device of FIGS. 2 and 3 can be modified as shown in FIG. 5. In the bar puller 122 of FIG. 5, the cam surface inset ring is replaced with a inset ring 124 having a cam surface 126 configured to expand the modified jaws 128 as the head 48 is inwardly displaced. In such embodiment the return spring 100 and load spring 92 are reversed. The return spring 100 encompasses a load pin 130 to maintain delivery of the load spring forces to the detent 80.

While in the principal embodiments the grip force of the jaws advantageously increases as the detent is displaced after jaw contact on the bar stock, in the modified puller 122, the outward force of the jaws on the inside of the hollow stock decreases as the detent is displaced after contact. In situations where this may be of significance, the user should select a high spring constant load spring and adjust the jaws to minimum tolerance to the inside diameter of the hollow stock. Because the hollow stock will encircle but not contact the stop screw 32, a washer 132 with three contact vanes 134 spaced between the jaws is added to the puller to provide a convenient contact for the hollow stock when initiating actuation of the jaws. These and other features make the detent actuated bar puller an effective device for pulling and setting a variety of different sized stock and workpieces.

While in the foregoing specification embodiments of the invention have been set forth in considerable detail for the purposes of making a complete disclosure of the invention, it should be apparent to those of ordinary skill in the art that numerous changes may be made in such details without departing from the spirit and principles of the invention.

What is claimed is:

1. A bar puller for attachment to a numerically controlled turret lathe having multiple tool stations comprising:
   a housing having mounting means for mounting the housing on a tool station of the lathe turret;
   an actuator head having locating means for positioning said head substantially within said housing with limited reciprocal movement therein, said actuator head having an exposed face;
   a plurality of gripping jaws uniformly mounted on said face of said actuator head with means for limited reciprocal displacement of said jaws on said face; and
   actuation means for actuating said jaws in response to displacements of said actuator head relative to said housing.

2. The bar puller of claim 1 wherein said actuation means includes a detent mechanism connected to said actuator head and operationally connected to said jaws, and wherein said housing includes a cam surface means slidably engageable with said detent mechanism for actuating said detent mechanism on displacement of said head in said housing.

3. The bar puller of claim 2 wherein said exposed face of said actuator head includes contact means for application of external forces for initiating actuation of said jaws.

4. The bar puller of claim 2 wherein said detent mechanism includes for each jaw, a detent, pivotally mounted to said actuator head and engageable with said cam surface means, a spring loaded piston unit in contact with said detent, a piston bore in said head for slidably retaining said piston, and, a carrier element connecting a grip jaw to said piston, wherein on pivotal displacements of said detent, said piston unit responds with a translated displacement and force effect directed to said connected jaws.

5. The bar puller of claim 4 wherein said spring loaded piston unit includes a compression load spring wherein displacements of said detent are in part absorbed by compression of said load spring and transmitted as a gripping force to said jaws.

6. The bar puller of claim 5 wherein said housing has an annular peripheral inset adjacent said head face and said cam surface means comprises a ring member insertable in said housing inset, said ring member having an annular cam surface engageable with said detent.

7. The bar puller of claim 6 wherein said ring member is replaceable by other similar ring members having different configured cam surfaces wherein a different actuation sequence is effected on displacements of said head in said housing.

8. The bar puller of claim 1 wherein said locating means comprises a shaft fixedly connected to said head and a bore in said housing in which said shaft is slidably engageable.

9. The bar puller of claim 8 wherein said locating means has limit elements on said head and said said housing for delimiting the displacement of said head in said housing.

10. The bar puller of claim 7 wherein said locating means has a compression spring cooperating with said limiting elements to bias the displacement of said head.

* * * * *